Figure 1:
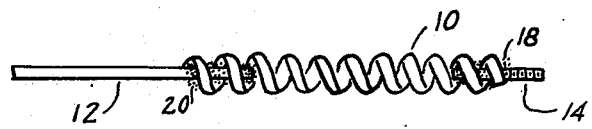

July 29, 1958   J. E. CLINE ET AL   2,844,868
METHOD OF JOINING REFRACTORY METALS
Filed June 1, 1954

INVENTORS
JAMES E. CLINE
JOHN P. JASIONIS
BY
ATTORNEY

2,844,868

METHOD OF JOINING REFRACTORY METALS

James E. Cline, Brookline, and John P. Jasionis, Belmont, Mass., assignors to Sylvania Electric Products Inc., a corporation of Massachusetts Application June 1, 1954, Serial No. 433,467

2 Claims. (Cl. 29—498)

The present invention relates to refractory metals, particularly tungsten and molybdenum, and to methods of joining parts formed of such metals.

It is often necessary to join two parts of molybdenum or of tungsten, as well as one part of molybdenum and another of tungsten, and in the case of vacuum tube fabrication the joint between such parts must withstand very high temperatures and be free from contamination. For example, in magnetrons of a well known design, a cathode heater of tungsten is joined to an electrical connector of molybdenum, to operate at temperatures approaching the melting point of molybdenum. In some specific cases, operating temperatures of 2000° C. to 2200° C. are encountered.

In such magnetrons, the need also arises for joining molybdenum wire mesh which is later coated with an electron emissive compound in producing the finished magnetron cathode. It has heretofore been suggested that various bonding materials be employed to join the mesh to its support such as nickel and platinum powder; but in a vacuum tube application, such materials develop an excessively high vapor pressure. Evaporation from the joint would in time weaken the joint. Moreover, the evaporation permits the bonding material to migrate to cathode coatings and to electrical insulators, causing electrical deterioration of such structures. This is especially pronounced in the case of cathode coatings, including thoria, where platinum and nickel tend to act as contaminants, reducing the electron emissive property of the cathode surface.

The foregoing particular considerations are satisfied by the present invention, but should not be considered in any way limiting, since in broader aspect this invention is widely applicable to the bonding of assembled parts of the metals, tungsten and molybdenum. These metals may be in any convenient or required form, as wire, sintered metal, tubes, rods, and the like.

In practicing with the present invention, tungsten parts, molybdenum parts, as well as parts of tungsten and of molybdenum, may be joined together by heating them while assembled with a quantity of ruthenium contacting both the parts at a temperature at which metal flow occurs. This temperature is approximately 1900° C., lower than the melting temperature of any of these metals. The melting temperature of molybdenum is 2620° C. The melting temperature of tungsten is 3370° C., while ruthenium is reported as melting at about 2500° C.

The ruthenium may be present in a variety of forms, as for example, pure powdered ruthenium, or a mixture of ruthenium and molybdenum, or as a compound of ruthenium which is reduced to metallic ruthenium during the treatment. The ruthenium bond may be applied to the parts to be assembled in a variety of ways, as for example, by coating one of the parts with a mixture of ruthenium powder and molybdenum powder in a vehicle of nitro-cellulose lacquer, or water; it may be dry powder; it may be a plated film on one or both of the parts; or it may be a pre-form of impacted powder, or wire, or a sheet-metal cut-out.

Figure 2:
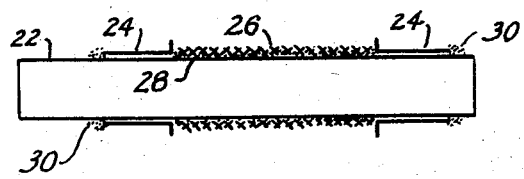

The invention will be better appreciated from the following specific applications shown in the accompanying drawings, wherein:

Fig. 1 is an enlarged view of a heater with its electrical terminals, for the cathode of a magnetron; and Fig. 2 is a somewhat schematic longitudinal cross-section of a magnetron cathode.

In Fig. 1, a tungsten wire 10 is shown assembled with molybdenum terminal rods 12 and 14, the latter being threaded for connection to an encasing cathode sleeve that also serves as a return circuit for the current that heats tungsten wire 10.

The parts shown are assembled and pure ruthenium powder in a nitro-cellulose lacquer vehicle is painted on the parts at regions 18, 20 where they engage each other. The assembled parts are heated above 1900° C. The atmosphere preferably is a reducing gas such as forming gas. A few seconds at the operating temperatures mentioned is sufficient to produce a reliable, permanent joint. High frequency induction heating is a practical and convenient method of developing heat in the required region. The joints formed have been found to be reliable even at temperatures substantially in excess of the treatment temperature. Thus, the cathodes and the heaters formed as detailed above have been operated at approximately 2200° C. to 2300° C. without encountering mechanical or electrical difficulty.

The ruthenium appears to be completely inert in respect to the electrical properties of the cathodes in which it is used to form a bond and appears not to vaporize from the cathode. This is an important advantage over other bonding materials that tend to vaporize and condense elsewhere within the vacuum tube structure so as to interfere with performance.

In electron tubes, both of the vacuum type and the gas fill type, this type of bond is of further special value since it does not trap and later release undesired gases which tend to interfere with tube operation and life.

Fig. 2 illustrates another application of the invention. Molybdenum cylinders 24 are assembled concentrically about another molybdenum cylinder 22, in forming "hats" on a magnetron cathode. In such assemblies, the cylinders are tightly fitted together. A minimum of pure ruthenium powder 30 is interposed between them, or applied to them where they are to be joined, prior to the heat treatment mentioned above. In still a further application, the molybdenum cathode structure is united to a molybdenum support by a like technique.

Fig. 2 illustrates an additional application of the invention in the fabrication of magnetron cathodes. When a magnetron cathode is being assembled, cylinder 22 of molybdenum is coated with a thin layer of molybdenum powder and ruthenium power in ratios of four to one and molybdenum wire mesh 26 is wrapped around the coated molybdenum cylinder. The assembled parts are heated to a temperature in the range of 1150° C. to 1400° C. in a fixture as of molybdenum; and this treatment has the effect of producing a preliminary mechanical bond. Thereafter, the assembled parts are removed from the fixture, again coated with the mixture containing ruthenium, and the whole is heated in vacuum or in an inert or reducing atmosphere to a temperature at which the coating is observed to flow. It appears that 1900° C. is a minimum, while 2100° C. is preferred. If too much coating material is used, or if too high a temperature is used, the parts to be joined tend to be excessively attacked in the bonding process. Flow has been observed and holes in the base cylinder have been produced where excessive temperatures were employed, near the melting point of molybdenum.

In each of the foregoing examples, at least one of the parts has been of molybdenum; and either pure ruthenium powder or a mixture of ruthenium and molybdenum was used. The use of the bonding material in the form of powder is excellent because of the simplicity of handling it in this form. However, it may be applied as by plating, and it may be provided as compacted pre-forms of the desired ruthenium or mixture, or it may be applied to one or both of the parts by electro-plating, or other suitable techniques. Where two parts of tungsten are to be joined, especially if the treatment temperature is not greatly in excess of 1900° C., it is desirable to include both the ruthenium and the molybdenum in the bonding material and not to rely on the pure ruthenium itself.

What is claimed is:

1. A method of making cathodes, including the steps of coating a cylindrical metal base with a thin layer of ruthenium powder, wrapping a molybdenum mesh around the coated base, heating the assembly of base and mesh to a temperature in the range of 1150° C. to 1400° C. to form a preliminary bond between the base and mesh, and thereafter heating the assembly to a temperature in the range of 1900° C. to 2100° C.

2. The method of joining a pair of refractory metal parts of the group consisting of tungsten and molybdenum including the steps of applying a layer of ruthenium to at least one of said parts in the area to be juxtaposed to the other part, holding said parts together, heating the assembly of parts to a temperature in the range of 1150° C. to 1400° C. to form a preliminary bond between the parts and thereafter heating the assembly to a temperature in the range of 1900° C. to 2100° C.

References Cited in the file of this patent

UNITED STATES PATENTS

| Number | Name | Date |
| --- | --- | --- |
| 600,250 | Reese | Mar. 8, 1898 |
| 2,282,097 | Taylor | May 5, 1942 |
| 2,341,716 | Herdman | Feb. 15, 1944 |
| 2,370,242 | Hensel | Feb. 27, 1945 |
| 2,387,903 | Hensel | Oct. 30, 1945 |
| 2,406,172 | Smithells | Aug. 20, 1946 |
| 2,504,521 | Greiner | Apr. 18, 1950 |
| 2,539,096 | Miller | Jan. 23, 1951 |
| 2,607,981 | Power | Aug. 26, 1952 |
| 2,659,964 | Nelson | Nov. 24, 1953 |
| 2,664,180 | Peters | Dec. 29, 1953 |
| 2,698,913 | Espersen | Jan. 4, 1955 |
| 2,719,797 | Rosenblatt | Oct. 4, 1955 |